(12) United States Patent
Jennings et al.

(10) Patent No.: US 7,058,932 B1
(45) Date of Patent: Jun. 6, 2006

(54) SYSTEM, COMPUTER PROGRAM PRODUCT, AND METHODS FOR EMULATION OF COMPUTER PROGRAMS

(75) Inventors: Andrew T. Jennings, West Chester, PA (US); G. Lawrence Krablin, Downingtown, PA (US); Timothy Neilson Fender, Berwyn, PA (US); William Stratton, Malvern, PA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/294,617

(22) Filed: Apr. 19, 1999

(51) Int. Cl.
G06F 9/44 (2006.01)
(52) U.S. Cl. .................... 717/138; 717/139; 717/146; 717/152
(58) Field of Classification Search ............... 717/5, 717/4, 124–160; 703/26; 712/224–227, 712/200; 395/500
See application file for complete search history.

(56) References Cited

U.S. PATENT DOCUMENTS

| | | | | |
|---|---|---|---|---|
| 5,313,614 A * | 5/1994 | Goettelmann et al. | ...... | 717/138 |
| 5,339,419 A * | 8/1994 | Chan et al. | ...... | 717/147 |
| 5,577,233 A | 11/1996 | Goettelmann et al. | ...... | 395/500 |
| 5,581,778 A * | 12/1996 | Chin et al. | ...... | 712/16 |
| 5,724,590 A | 3/1998 | Goettelmann et al. | ...... | 395/707 |
| 5,774,694 A * | 6/1998 | Murari | ...... | 395/500 |
| 5,790,825 A | 8/1998 | Traut | ...... | 395/385 |
| 5,815,720 A | 9/1998 | Buzbee | ...... | 395/709 |
| 5,832,205 A | 11/1998 | Kelly et al. | ...... | 395/185.06 |
| 6,021,275 A * | 2/2000 | Horwat | ...... | 717/136 |
| 6,044,220 A * | 3/2000 | Breternitz, Jr. | ...... | 395/705 |
| 6,075,942 A * | 6/2000 | Cartwright | ...... | 717/138 |
| 6,182,284 B1 * | 1/2001 | Sreedhar et al. | ...... | 717/146 |
| 6,223,339 B1 * | 4/2001 | Shah et al. | ...... | 717/136 |
| 6,247,172 B1 * | 6/2001 | Dunn et al. | ...... | 717/5 |
| 6,317,872 B1 * | 11/2001 | Gee et al. | ...... | 717/152 |
| 6,397,379 B1 * | 5/2002 | Yates et al. | ...... | 717/140 |
| 6,463,582 B1 * | 10/2002 | Lethin et al. | ...... | 717/158 |
| 2002/0100030 A1 * | 7/2002 | Souloglou et al. | ...... | 717/146 |

OTHER PUBLICATIONS

"Endian-Neutral Software Part 1", James Gillig, Dr. Dobbs Journal,v19,n11,p. 62 ISSN 1044-789X.*
"Endian-Neutral Software Part 2", James R. Gillig, Dr. Dobbs Journal,v19,n11,p. 62 ISSN 1044-789X.*
"Your Own Endian Engine", John Rogers, Dr. Dobbs Journal,v20,n11,p. 1-14 ISSN 1044-789X.*
"Bit operations with C Macros", John Rogers,Dr.Dobbs.*

* cited by examiner

*Primary Examiner*—Tuan Dam
*Assistant Examiner*—Chuck Kendall
(74) *Attorney, Agent, or Firm*—Lise A. Rode; Mark T. Starr; Woodcock Washburn (57) ABSTRACT

An emulation system, computer program product, and method for emulating the execution of a target program comprising instructions of an instruction set of a target computer on a host computer having a different instruction set operate by performing a static translation of the instructions of the target program into a series of instructions of an intermediate instruction set, the intermediate instruction set being optimized for interpretation on the host computer, and then executing the series of instructions of the intermediate instruction set by interpretation on the host computer.

33 Claims, 8 Drawing Sheets

Normal IRW

| Tag 9 | Delta | L a b a / M b d a |

Stuffed IRW

| Tag 1 | 0 | Stack Number | Disp | Offset |

Pseudo Stuffed IRW

| Tag 1 | 1 | Segment Number | Disp | Offset |

Figure 3c

IRW

| Tag 1 | Segment Number | Disp | Offset |

SYSTEM, COMPUTER PROGRAM PRODUCT, AND METHODS FOR EMULATION OF COMPUTER PROGRAMS

COPYRIGHT AND TRADEMARK NOTICES

A portion of the disclosure of this patent document contains material that is subject to copyright protection. The copyright owner has no objection to the facsimile reproduction by anyone of the patent document or the patent disclosure as it appears in the United States Patent & Trademark Office patent file or records, but otherwise reserves all copyright rights whatsoever.

Alpha is a trademark of Compaq Computer Corporation. ClearPath is a trademark of Unisys Corporation. Microsoft, Windows, and Windows NT are trademarks of Microsoft Corporation.

BACKGROUND

1. Field of the Invention

The present invention relates generally to computer emulation, and more particularly, to an improved system, computer program product, and method for emulating the execution of a target program comprising instructions of an instruction set of a target computer on a host computer having a different instruction set.

2. Description of the Prior Art

The idea of emulating an existing software execution environment on a hardware architecture other than the one it was designed for is not new. There are several successful emulators available today.

Some prior art emulators rely primarily on pure object code translation to port software from one machine (the target machine) to another machine (the host machine). The translation process is static. The code is translated prior to loading and executing the program. The translator produces native code of the host machine. Any residual untranslatable code of the target machine is interpreted on the host machine. Some emulators of this type will produce a mapping between native and interpreted code to facilitate the switching between the two modes of operation. Generally, pure object code translation is complex and difficult, particularly where the target and host machine instruction sets and associated architectures differ significantly. Producing correct program diagnostic information in the case of failures is extremely difficult in emulators that take this approach.

Other prior art emulators rely on purely interpretive execution, in which existing code files are directly interpreted without requiring any form of translation. Pure interpretive execution avoids some of the complexities and difficulties encountered with a pure object code translation approach. For example, producing correct program diagnostic information in the case of failures is less difficult. Generally, however, emulators that rely upon pure interpretive execution do not perform as well as emulators that rely upon pure object code translation, since interpretive execution is typically much slower than execution of native code.

Both of these types of prior art emulators go to great pains to exactly reproduce all the software visible architectural state of the target machines. This exact replication minimizes the changes to the target operating system required to support the emulation. It can, however, result in a potentially heavy run time performance penalty because the exact behavior of what are now purely fictitious hardware elements must be faithfully preserved.

Accordingly, there is a need for an emulation system and method that overcomes the aforementioned deficiencies of the "pure object code translation" and "pure interpretive execution" approaches of the prior art. The present invention satisfies this need.

SUMMARY OF THE INVENTION

The present invention is directed to a system, computer program product, and methods for emulating the execution of a target program comprising instructions of an instruction set of a target computer on a host computer having a different instruction set. A method of the present invention comprises the steps of (i) performing a static translation of the instructions of the target program into a series of instructions of an intermediate instruction set, the intermediate instruction set being optimized for interpretation on the host computer, and then (ii) executing the series of instructions of the intermediate instruction set by interpretation on the host computer. An emulation system in accordance with the present invention comprises a code translator that performs a static translation of the instructions of the target program into a series of instructions of the intermediate instruction set, and an interpreter that executes the series of instructions of the intermediate instruction set by interpretation on the host computer. Various techniques are employed in the definition of the intermediate instruction set to optimize it for high speed interpretation on the host computer. In one embodiment, the method or system of the present invention may be embodied in the form of program code stored on a computer-readable medium. A method for defining the intermediate instruction set is also encompassed within the present invention.

Additional features and advantages of the present invention will become evident hereinafter.

BRIEF DESCRIPTION OF THE DRAWINGS

The foregoing summary, as well as the following detailed description of the preferred embodiment, is better understood when read in conjunction with the appended drawings. For the purpose of illustrating the invention, there is shown in the drawings an embodiment that is presently preferred, it being understood, however, that the invention is not limited to the specific methods and instrumentalities disclosed. In the drawings.

DETAILED DESCRIPTION OF THE PREFERRED EMBODIMENT

The present invention is directed to a system and method for emulating the execution of a target program comprising instructions of an instruction set of a target computer on a host computer having a different instruction set. The methods or system of the present invention may take the form of a computer program product comprising program code (i.e., instructions) embodied in tangible media, such as floppy diskettes, CD-ROMs, hard drives, or any other machine-readable or computer-readable medium, wherein, when the program code is loaded into and executed by a machine, such as a computer, the machine becomes an apparatus for practicing the invention. The methods and system of the present invention may also be embodied in the form of program code that is transmitted over some transmission medium, such as over electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Figure 1:
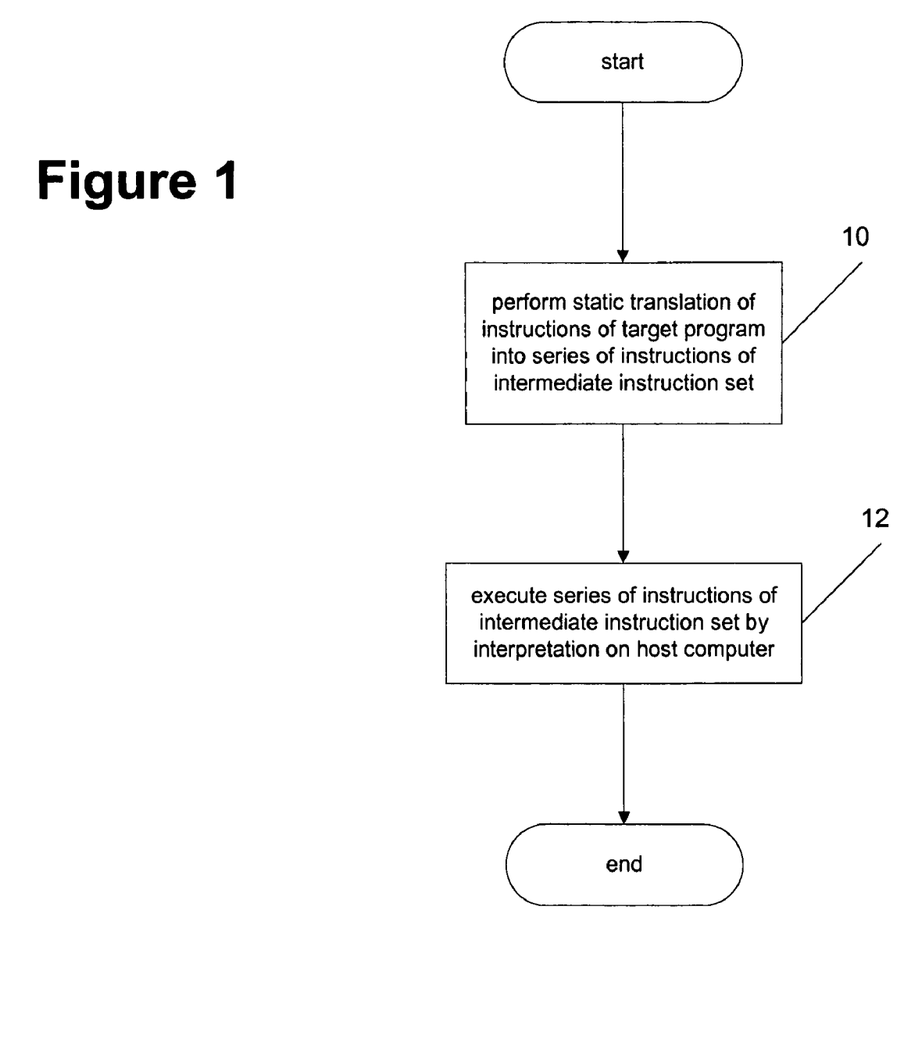
FIG. 1 is a flow diagram illustrating the method of the present invention.

Referring to the drawings, wherein like numerals represent like elements throughout, FIG. 1 illustrates an emulation method of the present invention in accordance with a preferred embodiment thereof. The method provides for the emulation of a target program, which comprises instructions (i.e., object code) of an instruction set of a target computer, on a host computer having a different instruction set.

As shown, in a first step 10 of this method, a static translation of the instructions of the target program is performed to translate the instructions of the target program into a series of instructions of an intermediate instruction set. As described hereinafter in greater detail, the intermediate instruction set is optimized for high speed interpretation on the host computer.

As used herein, the term "static translation" means translation in which all of the code of the target program is translated prior to any execution of the translated code file. The translation is performed only once, and a permanent copy of the translated code is maintained. This differs from dynamic translation (another form of translation used by architectural emulators), in which translation of a target program is performed on demand during the execution of the code file. Dynamic translators typically maintain a cache of translated code pages in order to, firstly, reduce the occurrence of repetitive re-translation of the same code and, secondly, to detect self-modifying code. No permanent record of the translation is maintained when dynamic translation is employed.

Next, at step 12, the resulting series of instructions of the intermediate instruction set is executed by interpretation on the host computer. Because the intermediate instruction set is optimized for high speed interpretation, an increase in performance is achieved over prior art emulators in which "pure interpretive execution" of the target program is performed. Additionally, static translation of the target program to an intermediate instruction set avoids the complexities that would otherwise be encountered in translating directly to the native instruction set of the host computer, as is done in prior art emulators that employ the "pure object code translation" approach.

1. System Overview

Figure 2:
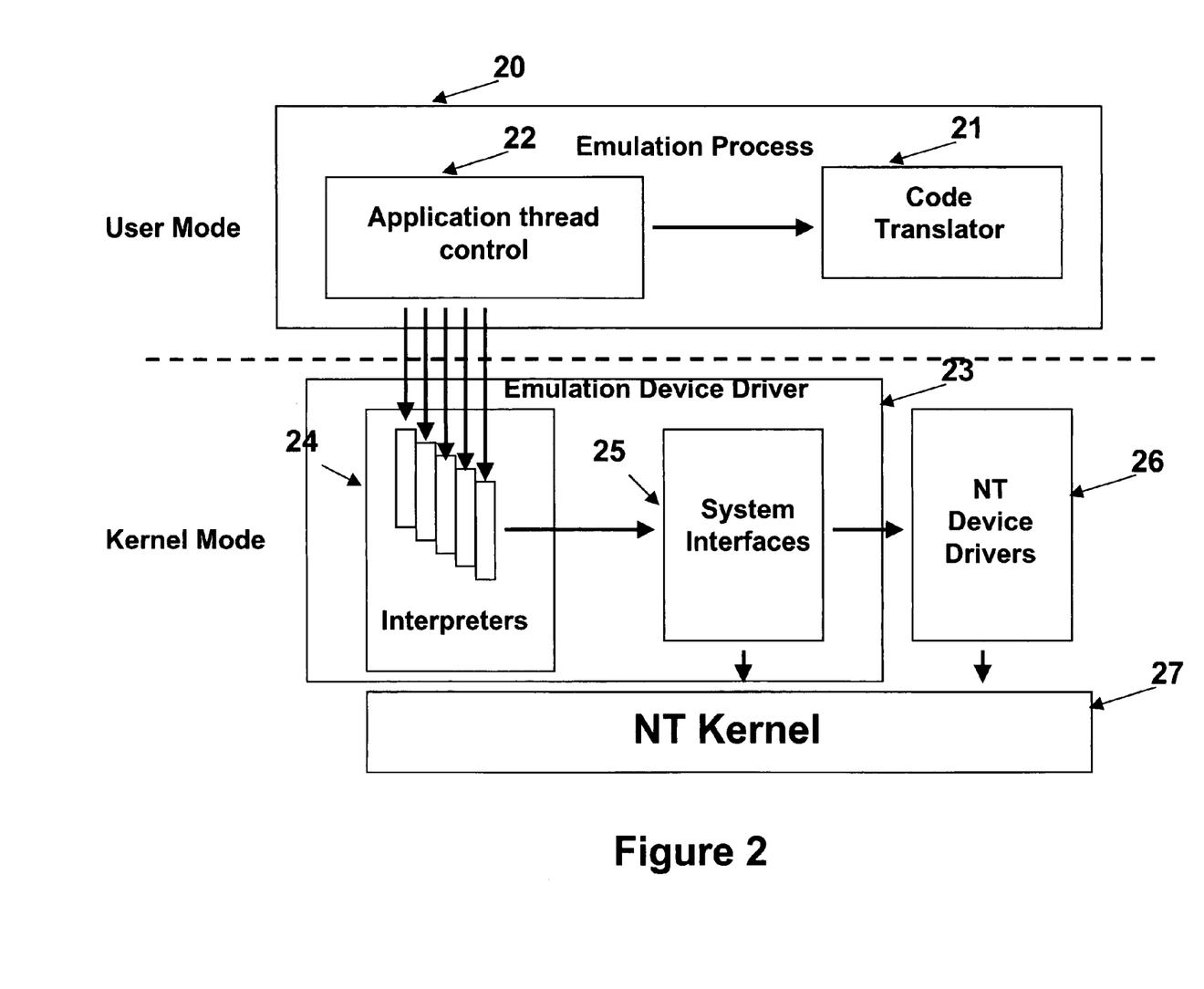
FIG. 2 is a block diagram illustrating one embodiment of an emulation system that operates in accordance with the present invention.

FIG. 2 is a block diagram illustrating one embodiment of the method of the present invention in an emulation system that has been developed to enable target programs written for Unisys A-Series and Clearpath HMP NX computer systems (target machine), which execute the Unisys MCP/AS operating system, to be executed by emulation on servers that execute the Microsoft® Windows® NT operating system on 64 bit Alpha microprocessors (e.g., the Alpha 20164) available from Intel Corporation (host machine). Unisys A-Series and Clearpath HMP NX computer systems employ proprietary processors that implement a native instruction set referred to by Unisys as the "E-mode" instruction set (the target instruction set). Details of the E-mode instruction set and associated machine architecture are provided in the ClearPath HMP NX5600, NX5800, and NX5820 Level Delta Architecture Support Reference Manual, Document # 7016 6970-001, which is available from Unisys Corporation and which is hereby incorporated by reference in its entirety. Alpha microprocessors, like the microprocessors of other vendors, implement their own native instruction set (the host instruction set). It is understood, however, that the method and system of the present invention is not limited to these machine environments, but rather, may be employed to provide emulation for any combination of target and host machines that have different instruction sets and associated architectures.

In the present embodiment, the emulation system does not emulate the exact behavior of any existing Unisys A-Series or Clearpath HMP NX hardware platform. Instead, it creates an execution environment that is sufficiently similar to an existing A-Series or Clearpath HMP NX system running MCP/AS, such that it is possible to emulate all existing application software without requiring recompilation or any other changes to the original symbolic. The emulation is constrained, at the application level, to produce exactly the same results that would have been obtained if the original application object code files had been executed on an existing E-Mode system (e.g., A-Series or Clearpath HMP NX). In order to meet this requirement, most of the target system's operating system (MCP/AS) must also be emulated in the same manner. Those portions of the target system's operating system that are concerned with the physical characteristics of the hardware are replaced by libraries that invoke the host system's operating system interfaces directly.

As shown in FIG. 2, the emulation system comprises an emulation process 20 which creates the addressing environment within which the applications will be emulated and an emulation device driver 23. Contained within the emulation process 20 is a code translator 21 that performs a static translation of the instructions of a target program into a series of instructions of an intermediate instruction set (described hereinafter) and a thread control module 22 which creates and destroys the emulated application threads. The emulation device driver 23 comprises an interpreter 24 that executes a series of instructions of the intermediate instruction set by interpretation on the host computer; and a set of system interfaces 25 that can be invoked directly by the interpreted code. In the present embodiment, in which the host machine comprises an Alpha server running Microsoft® Windows® NT, the emulation process 20, including the translator 21, executes in user mode, and the interpreter 24 and system interfaces 25 run in kernel mode. The system interfaces 25 interface with various NT device drivers 26 and the NT kernel 27.

1.1 Code Translation

Before a target program code file is executed by the emulation system, it is first statically translated by the code translator 21. In the present embodiment, the translator 21 accepts as input any E-Mode Level Gamma or Delta code file (target program) and produces an intermediate code file comprising a series of instructions of an intermediate instruction set (described hereinafter). No dynamic translation of code is performed.

A goal of the translator 21 is to reduce the run-time overheads to a minimum by performing as much analysis as possible prior to execution. One restriction imposed by the use of a totally static code translation technique is that the target program cannot include self-modifying code. Apart from translating the target program code file, the translator also maintains the relationship between the translated code and the original symbolic program. This is done by adjusting the symbolic line information included in the original code file, thus preserving the existing test and diagnostic facilities.

Untranslated code files, or any code file created by a compiler running on the system, will be translated automatically when the software attempts to enter the E-Mode code file in the disk directory. The code translator is written in C++ and runs as a normal user process under NT. In the preferred embodiment, the translator 21 employs a method for determining the destination of a dynamic branch that is described in commonly assigned application Ser. No. 09/239,282, filed Jan. 29, 1999, which application is hereby incorporated by reference in its entirety.

1.2 Interpreter

The primary function of the interpreter 24 is to interpret code sequences of the intermediate instruction set. It also supplies mechanisms that permit interpreted code to directly call natively compiled functions. In the present embodiment, the emulation system supports multiple instantiations of the interpreter, each one representing an emulated application.

The interpreter 24 is written in C++ and runs in kernel mode. In the present embodiment, the interpreter 24 is the only component that is written, overtly, to run on a 64 bit microprocessor, e.g., in the present embodiment, a 233 MHz Alpha 20164 microprocessor. Additional details of the interpreter 24 are provided hereinafter.

1.3 System Interfaces

The emulation system supplies a set of system interfaces 25 that may be invoked by the interpreter 24 to perform certain system functions. In the present embodiment, these interfaces subsume the functions supplied by the hardware components of the target machine (e.g., A-Series or Clearpath HMP NX system) other than the processor (e.g. the I/O Processor (IOP), the Task Control Unit (TCU), etc.). However, they do not make any attempt to emulate the behavior of any of the hardware that they are replacing. Rather, these interfaces 25 mimic the behavior of the current interfaces to the MCP Physical I/O module, which are concerned solely with logical entities. In order to support this structure, the MCP/AS operating system has been modified for execution on the emulation system, and an alternate, effectively empty, module has been incorporated in the MCP/AS which invokes the previously mentioned libraries that call the host systems operating system directly. The interpreter detects the standard calling sequences used by the software to invoke the module interfaces, and calls its own version of the requested function, which is implemented entirely in native C++ code on the host machine. This code interfaces directly with the NT Kernel 27 and device drivers 26 resident on the host machine. The entire mechanism is invisible to the target software. The effect of this approach is twofold. Firstly, the emulation system is not required to mimic the behavior of non-existent hardware, and, secondly, significant, highly performance critical sections of the target operating system (MCP/AS) are no longer interpreted. Similarly, the MCP/AS Process Switching, Processor Control, and Date and Time modules have been replaced with empty alternatives, thus subsuming the current TCU functionality at an abstract, logical level.

2. Intermediate Instruction Set Definition

As explained above, in accordance with the method and system of the present invention, a target program to be executed by emulation on the host machine is first translated into a series of instructions of an intermediate instruction set, and then that series of translated instructions is executed by interpretation on the host machine. The intermediate instruction set is designed for high speed interpretation on the host machine. This novel approach to target program emulation has numerous advantages.

First, in cases in which the architectural mismatch between the target machine and the host machine is great, direct translation into the native code of the host machine can be extremely difficult. For example, in the present embodiment, the E-Mode architecture of Unisys A-Series and Clearpath HMP NX systems is a descriptor based, data driven architecture that differs significantly from the Alpha microprocessor architecture. Moreover, if the mismatch is substantial, the volume of code resulting from a direct translation to native code of the host machine may be so great that performance would be no better than can be achieved through direct interpretation anyway.

Second, the generation of an intermediate form, which can initially be more similar to the instruction set of the target machine (e.g., E-Mode) but can then be evolved over time, is a significantly simpler undertaking and is also independent of the host machine architecture.

Third, an interpreter has the potential to be made permanently cache local in the host machine. Directly generated native code cannot.

In the present embodiment, the intermediate instruction set is a 64-bit derivative of the Unisys E-Mode instruction set. In accordance with the present invention, its definition is designed to permit high performance interpretation on a 64-bit microprocessor, such as the Alpha microprocessor. There are three aspects to the definition of the intermediate instruction set: control word formats, code structure, and the definition of the instructions themselves.

2.1 Control Words

Within the E-Mode definition, words in memory can be classified as either operands or control words. Operands contain simple data items such as floating point or integer numeric values or strings of characters. Control words are uniquely tagged words that are both created and decoded by the underlying processor. They contain indirect addresses, stack frame linkages, data descriptors and other non-operand entities.

In order to facilitate high speed interpretation on the host machine in accordance with the present invention, all operands and control words of the intermediate instruction set are mapped into 64 bits, the fundamental word size of the host machine (e.g., a 64-bit Alpha 20164). A tag occupies the high-order 4 bits. The low-order 48 bits of all operands are identical to the equivalent E-Mode definition in order to maintain full data and application program compatibility with existing systems. The control words have all been redefined to make use of all the remaining 60 bits, as described more fully below.

Figure 3A:
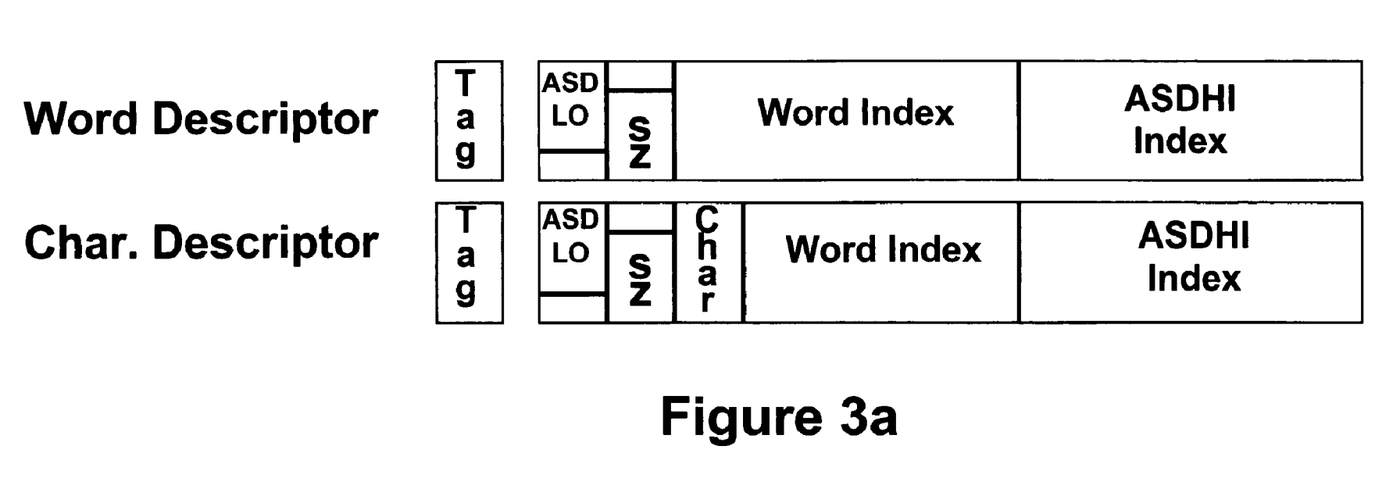
FIGS. 3a–f provide details of an intermediate instruction set in accordance with the embodiment of FIG. 2.
Figure 3B:
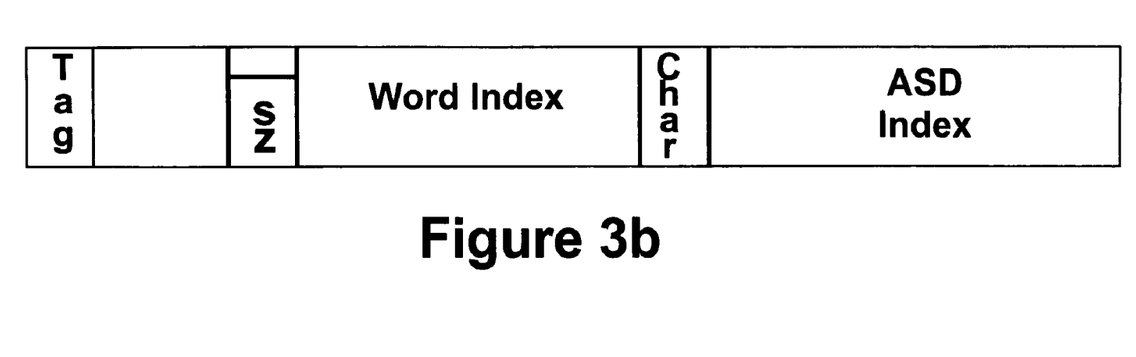

Further according to the present invention, the control words of the target machine instruction set (E-mode) have been redefined in the intermediate instruction set in order to minimize the number of masking and shifting operations needed to decode these control words. One example of this aspect of the invention is illustrated in FIGS. 3a and 3b. FIG. 3a shows the format of two forms of data descriptors in the E-mode instruction set, a word descriptor and a data descriptor. In both of these forms, an Absolute Segment Descriptor (ASD) index is split into two fields, ASDLO and ASDHI. ASDs are a feature of the virtual memory scheme of the E-mode architecture. Specifically, the E-Mode architecture defines a segmented virtual memory scheme as opposed to the more commonly used paged virtual memory technique. Each virtual segment is described by an Actual Segment Descriptor (ASD). These ASDs are maintained in a table which is analogous to the page tables used by paged virtual memory systems.

FIG. 3b illustrates the descriptor format of the intermediate instruction set. As shown, in the intermediate instruction set, a single form of descriptor is defined in which the ASD index is provided in a single, contiguous field. By eliminating the separate fields of the E-mode definition, fewer masking and shifting operations are required to decode this type of control word. Optimal extraction of the ASD index and table entry associated with any given segment has a significant effect on the overall performance of the system.

Figure 3C:
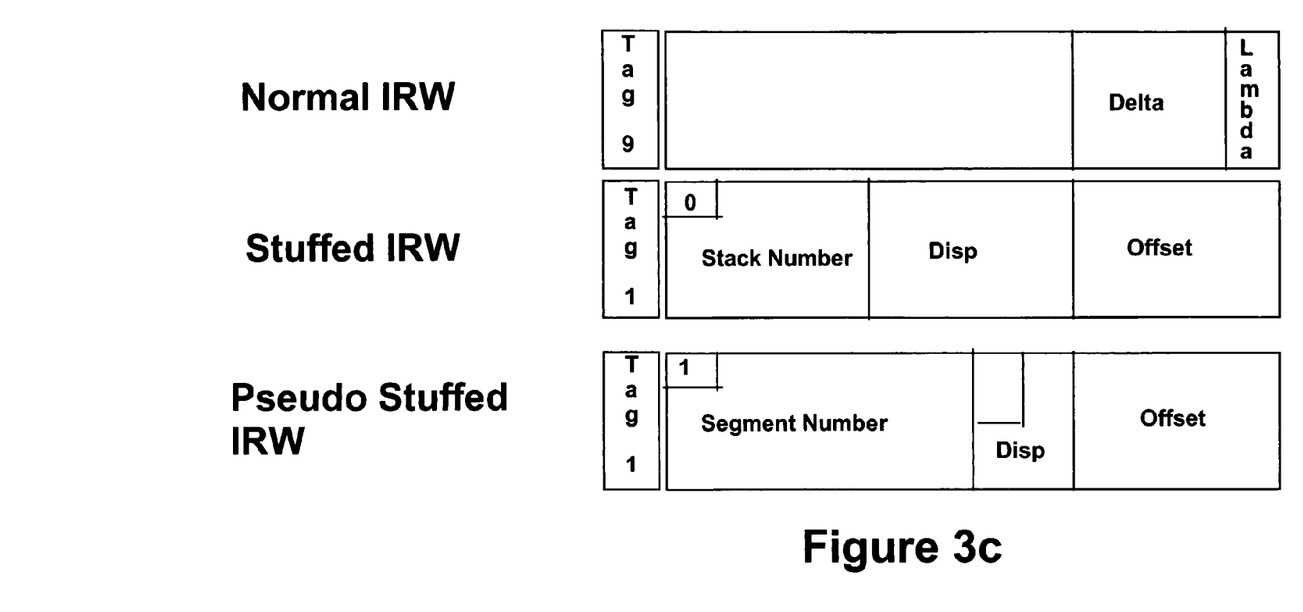

Also in accordance with the present invention, control words of the target machine instruction set (E-mode) have been redefined in the intermediate instruction set to enable the control word type to be determined as rapidly as possible. For example, as illustrated in FIG. 3c, there are three forms of indirect reference words (IRW) in the E-mode instruction set, Normal IRW, Stuffed IRW, and Pseudo Stuffed IRW. The Normal IRW form has a tag value of 9, whereas the others have a tag value of 1. In the intermediate instruction set, these three different indirect reference word forms have been redefined into a single indirect reference word form shown in FIG. 3d. Because the number of different forms has been reduced, the interpreter will be able to identify a control word of this type more rapidly.

Figure 3D:
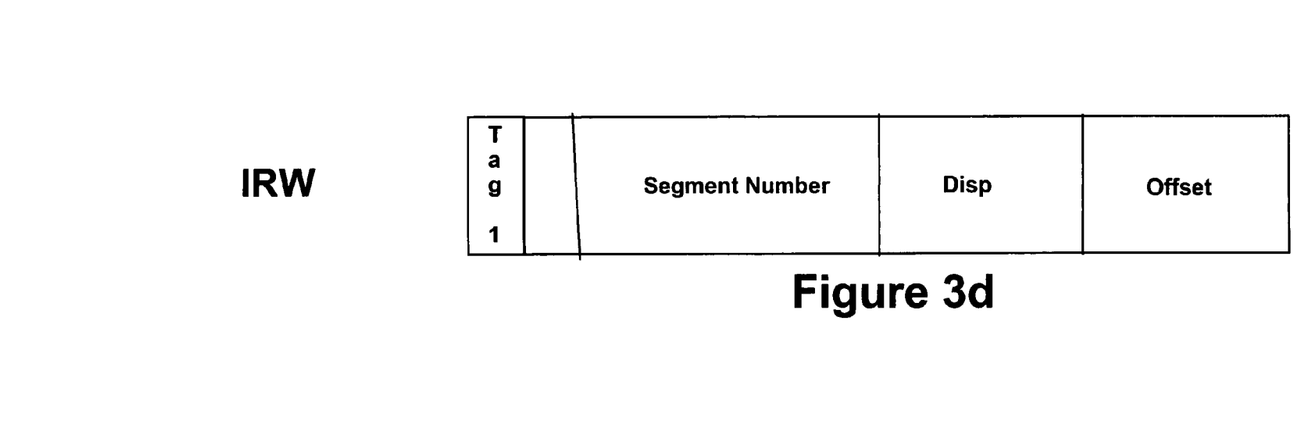
Figure 3E:
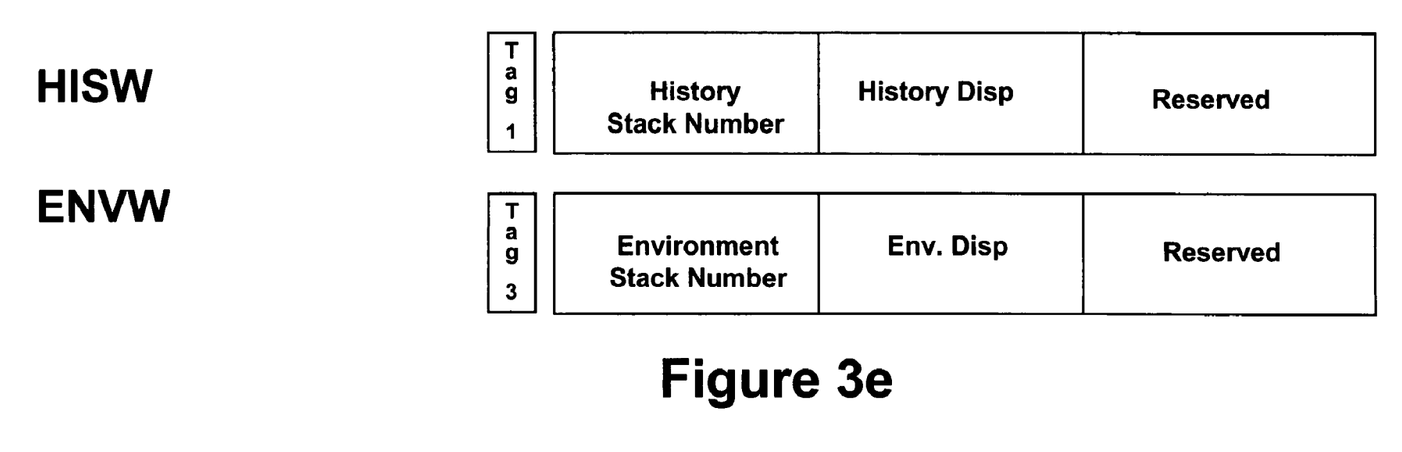
Figure 3F:
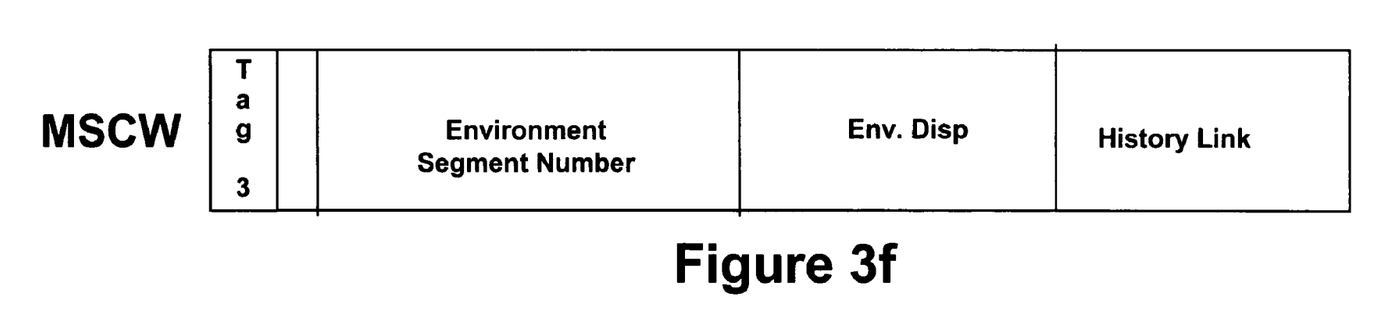

Common to both of the foregoing examples, and another feature of the intermediate instruction set that facilitates high speed interpretation is that the number of different control words has been reduced in the intermediate instruction set as compared to the E-mode instruction set. For example, as shown in FIGS. 3a and 3b, the word and character descriptors of the E-mode instruction set have been reduced to a single form of descriptor in the intermediate instruction set. Similarly, as shown in FIGS. 3c and 3d, the three different forms of indirect reference words of the E-mode instruction set have been reduced to a single form of indirect reference word in the intermediate instruction set. FIGS. 3e and 3f provide another example of this kind of reduction. As shown in FIG. 3e, an E-mode stack linkage consists of two words, a History Word (HISW) and an Environment Word (ENVW). In the intermediate instruction set, as illustrated in FIG. 3f, these have been reduced to a single word, referred to as a Mark Stack Control Word (MSCW), which contains both the historical and environmental links to the prior stack frame.

Because the number of different control words and the number of different formats found in the E-Mode architecture have been reduced in the definition of the intermediate instruction set, run-time decoding complexity has been significantly reduced. Also, as a side effect of these changes, many fields of the control words of the intermediate instruction set are larger than the corresponding fields that they replace in the E-mode instruction set, resulting in an increase in both the number of ASDs and the number of stacks that can be supported.

2.2 Code Structure

Code words are words that contain the actual instructions (i.e., opcodes and associated operands) of an instruction set. Interpreters typically suffer from the inherent overhead of locating, isolating, and decoding instructions in software. This overhead can, quite easily, exceed the time taken in the actual interpretation of many instructions. In the E-Mode architecture, code segments are tagged, big endian ordered, byte streams. Each code word contains 6 code syllables, each syllable being one byte long. Instructions are of variable length and may cross word boundaries. This structure does not lend itself to fast interpretation.

The structure of the code words of the intermediate instruction set is modified from that of the E-mode instruction set in a number of important respects. First, the code words of intermediate instruction set have been defined to have a length that matches the fundamental word size of the host machine architecture. In the present embodiment, in which the host machine architecture is that of the 64-bit Alpha microprocessor, the code words of the intermediate instruction set are defined as untagged 64 bit words, and all 64 bits are used to contain instructions and their embedded parameters. Additionally, each code word of the intermediate instruction set contains two fixed length, 32-bit instructions. Furthermore, these 32-bit instructions are defined such that they do not cross word boundaries. These characteristics of the code word structure of the intermediate instruction set (i.e., a code word size that matches the fundamental word size of the host machine architecture, a change from variable to fixed length instructions, and the elimination of instructions that cross word boundaries), permit the interpreter 24 to process the translated code stream in the minimum number of instructions on the host machine.

2.3 Instruction Definition

The E-mode architecture is a stack based architecture and its instruction set comprises a set of zero-address instructions that implement a reverse polish notation. A zero-address instruction is one in which the operands are implied. For example, in order to perform a simple addition of two operands, instructions are first executed to move the operands onto a stack, and then a zero-address form of ADD instruction is executed to perform the addition on those two stack elements. While this architecture is both elegant and simple, it tends to cause a relatively large number of very simple instructions to be executed. To this extent, it is somewhat RISC-like. Hardware implementations can effectively overcome this deficiency. Software interpreters cannot hide it with any ease. A second impediment to the fast interpretation of the E-Mode instruction set is its data driven architecture. For example, there is a single ADD operator that handles both integer and floating point and single and double precision inputs in any combination. The determination of the nature of the inputs at the start of each operator imposes a severe overhead on an interpreter. A third impediment to the fast interpretation of the E-Mode instruction set is that the order of the stack inputs to a given instruction are not fixed and are determined at execution time.

To overcome these impediments in the intermediate instruction set of the present invention, (i) the number of instructions seen by the interpreter for a given operation has been reduced, and (ii) the use of the expression stack for the maintenance of intermediate results has been reduced, which in turn has reduced the requirement to repetitively revalidate the input types and input ordering to instructions.

The foregoing reductions are achieved in the present invention by converting, wherever possible, the zero-address instructions of the E-mode instruction set into a set of one-address and two-address instructions that can be synthesized by the code translator from the original zero-address instructions. More specifically, the E-mode instructions for pushing data onto a stack (e.g., for loading operands or for storing results) for use in a subsequent zero-address instruction operation (e.g., ADD) have been incorporated as explicit addresses into a new instruction in the intermediate instruction set for performing that same operation. Additionally, whereas the E-Mode instruction set is based on a variable length notation, the intermediate instruction set is based on a fixed length notation. In the present embodiment, a 32-bit fixed length notation is employed that permits up to 8 forms of each basic E-Mode instruction to be included in the intermediate instruction set. These forms, which are illustrated respectively in FIGS. 4a, 4b, 4c, and 4d are organized into four groups:

GroupA containing two, two address forms;
GroupB containing three, one address forms;
GroupC containing two, one address forms; and
Group D containing the original zero address form.

Figure 4A:
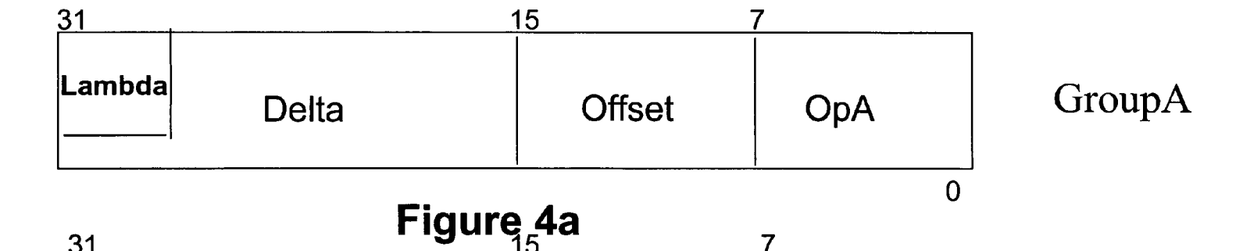
FIGS. 4a–d illustrate further details of the intermediate instruction set of the embodiment of FIG. 2.
Figures 4B, 4C:
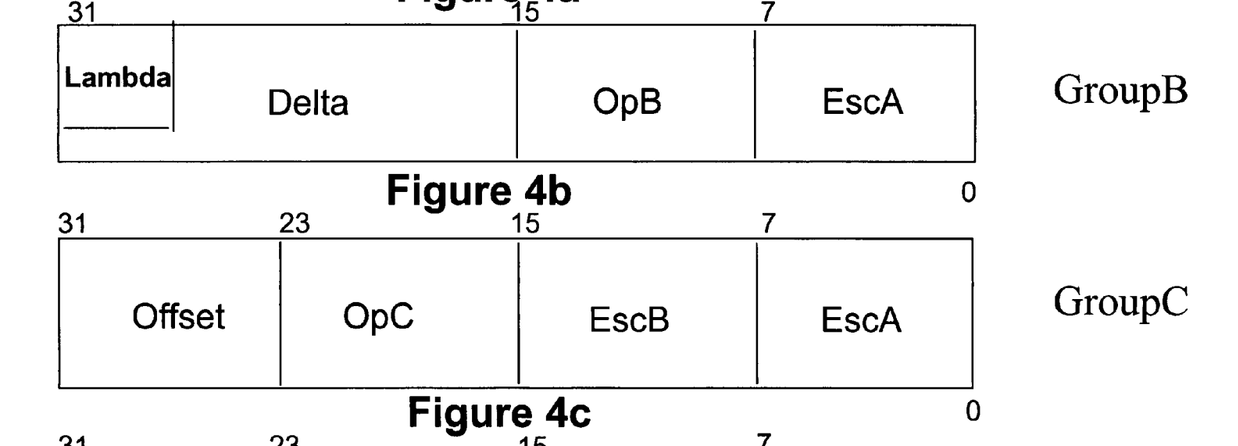
Figure 4D:
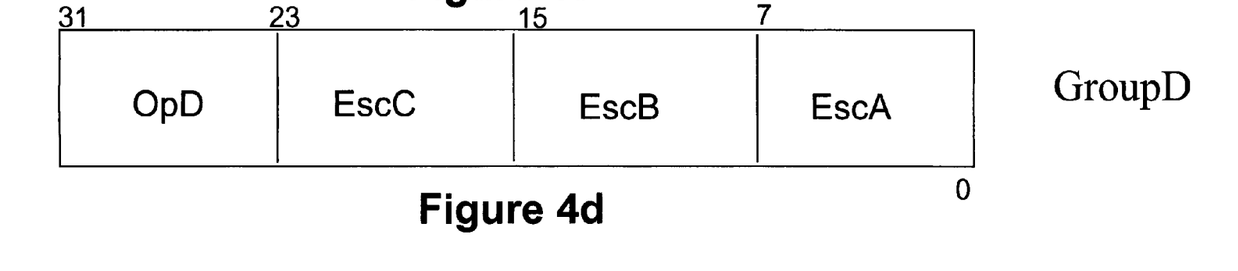

As shown in FIG. 4a, the format of the instructions of GroupA contain a Lambda and Delta field which form the address couple of one of the inputs, an offset field which contains either an immediate 8 bit literal value or the offset from the current lexical level of the second input, and an OpA field which contains the instruction code (e.g. ADD). As shown in FIG. 4b, the format of the instructions of GroupB contain a Lambda and Delta field which either form the address couple of one of the inputs or contain an immediate 13 bit literal, an OpB field which contains the instruction code (e.g. ADD) and an EscA field which contains a reserved OpA instruction code which specifies that this instruction is not of GroupA format. As shown in FIG. 4c, the format of the instructions of GroupC contain an offset field which contains either an immediate 8 bit literal value or the offset from the current lexical level of one of the inputs, an OpC field which contains the instruction code (e.g. ADD), an EscB field which contains a reserved OpB instruction code which specifies that this instruction is not of GroupB format, and an EscA field which contains a reserved OpA instruction code which specifies that this instruction is not of GroupA format. As shown in FIG. 4d, the format of instructions of GroupD contain an OpD field which contains the instruction code (e.g. ADD), an EscC field which contains a reserved OpC instruction code which specifies that this instruction is not of GroupC format, an EscB field which contains a reserved OpB instruction code which specifies that this instruction is not of GroupB format, and an EscA field which contains a reserved OpA instruction code which specifies that this instruction is not of GroupA format. GroupD instructions are used to contain a re-encoded form of the original E-Mode instructions when the code translator is unable to translate them into one of the other groups.

The different forms within each group include the following:
GroupA forms:
    valc(LL, offset), namc(lambda, delta), OpA or valc(LL, offset), valc(lambda, delta), OpA
    valc(lambda, delta), Lt offset, OpA
GroupB forms:
    namc(lambda, delta), OpB
    valc(lambda, delta), OpB
    Lt delta, OpB
GroupC forms:
    valc(LL, offset), OpC
    Lt offset, OpC
GroupD forms
    OpD It should be noted that there are miscellaneous instructions that do not fall into any of the above formats (e.g. branch instructions and bit field manipulation instructions). These are mostly encoded as GroupA instructions.

As an example, the E-Mode INDX instruction is represented six times in the intermediate instruction set:

| Group | Mnemonic | E-Mode Equivalent Code |
|---|---|---|
| GroupA: | INDX1 | valc, namc, indx |
|  | INDX2 | lt8, namc, indx |
| GroupB | INDX3 | namc, indx |
|  | INDX4 | valc, indx |
|  | INDX5 | lt16, indx |
| GroupD | INDX | indx |

Similarly, the E-Mode ADD instruction is represented five times in the intermediate instruction set:

| Group | Mnemonic | E-Mode Equivalent Code |
|---|---|---|
| GroupA: | ADD1 | valc, valc, add |
|  | ADD2 | valc, lt8, add |
| GroupB | ADD4 | valc, add |
|  | ADD5 | lt16, add |
| GroupD | ADD | add |

In each case, an E-mode operation that requires multiple individual instructions to be fetched and executed has been reduced to a single instruction. For example, the ADD1 instruction of Group A above replaces the three equivalent E-mode instructions: valc (push first operand onto stack), valc (push second operand onto stack), and add (add the two stack elements together). Essentially, the two load instructions, valc, have been converted into explicit addresses in the newly defined ADD1 instruction of the intermediate instruction set.

By converting the zero-address instructions of the E-mode instruction set into equivalent one-address and two-address instructions in the intermediate instruction set, an E-mode code file that has been translated into a set of instructions of the intermediate instruction set requires the interpretation of, typically, less than fifty percent (50%) of the number of instructions that would have been required to interpret the original E-Mode code file. The following are additional examples illustrating the reduction in the number of intermediate instructions that must be fetched and executed in order to implement a given language construct:

| Language Construct | E-Mode Instruction Set | Intermediate Instruction Set |
|---|---|---|
| A[i] | valc, namc, nxlv | xlod1 |
| i:=i+10 | valc, lt8, add, namc, stod | incd2 |
| if i<j goto | valc, valc, less, brtr | less1, brbs |

As a direct consequence of synthesizing one-address and two-address instructions from the zero-address E-mode form, the number of intermediate results that need to be passed between operators by pushing them onto, and then popping them off, the expression stack is correspondingly reduced. This effect can be illustrated by examining the number of stack operations generated by the examples given above:

| Language Construct | E-Mode Stack Operations | Intermediate Instruction Set Stack Operations |
|---|---|---|
| A[i] | 5 | 1 |
| i:=i+10 | 8 | 0 |
| if i<j goto | 6 | 2 |

It should be noted, however, that the fixed length 32 bit instruction format of the present embodiment of the intermediate instruction set does not allow sufficient space to encode certain powerful instructions, specifically compare and branch instructions and load and field isolate instructions. To overcome this limitation the interpreter performs a degree of dynamic synthesis combining certain instructions of the intermediate instruction set at execution time. For instance, in the example given above of the code produced for the construct "if i<j goto" the "less1, brbs" instructions are combined at run time to form a single 64 bit compare and branch instruction. This combination reduces the number of stack operations required to perform the function to zero.

All the foregoing techniques described in this section 2, alone or in combination, comprise a method for defining an intermediate instruction set optimized for interpretation on a host computer, for use in an emulation system or method in which a target program, which comprises instructions of an instruction set of a target machine, is executed by emulation on the host computer by (i) performing a static translation of the instructions of the target program into a series of instructions of the intermediate instruction set, and then (ii) executing the series of instructions of the intermediate instruction set by interpretation on the host computer.

3. Interpretation

Figure 5:
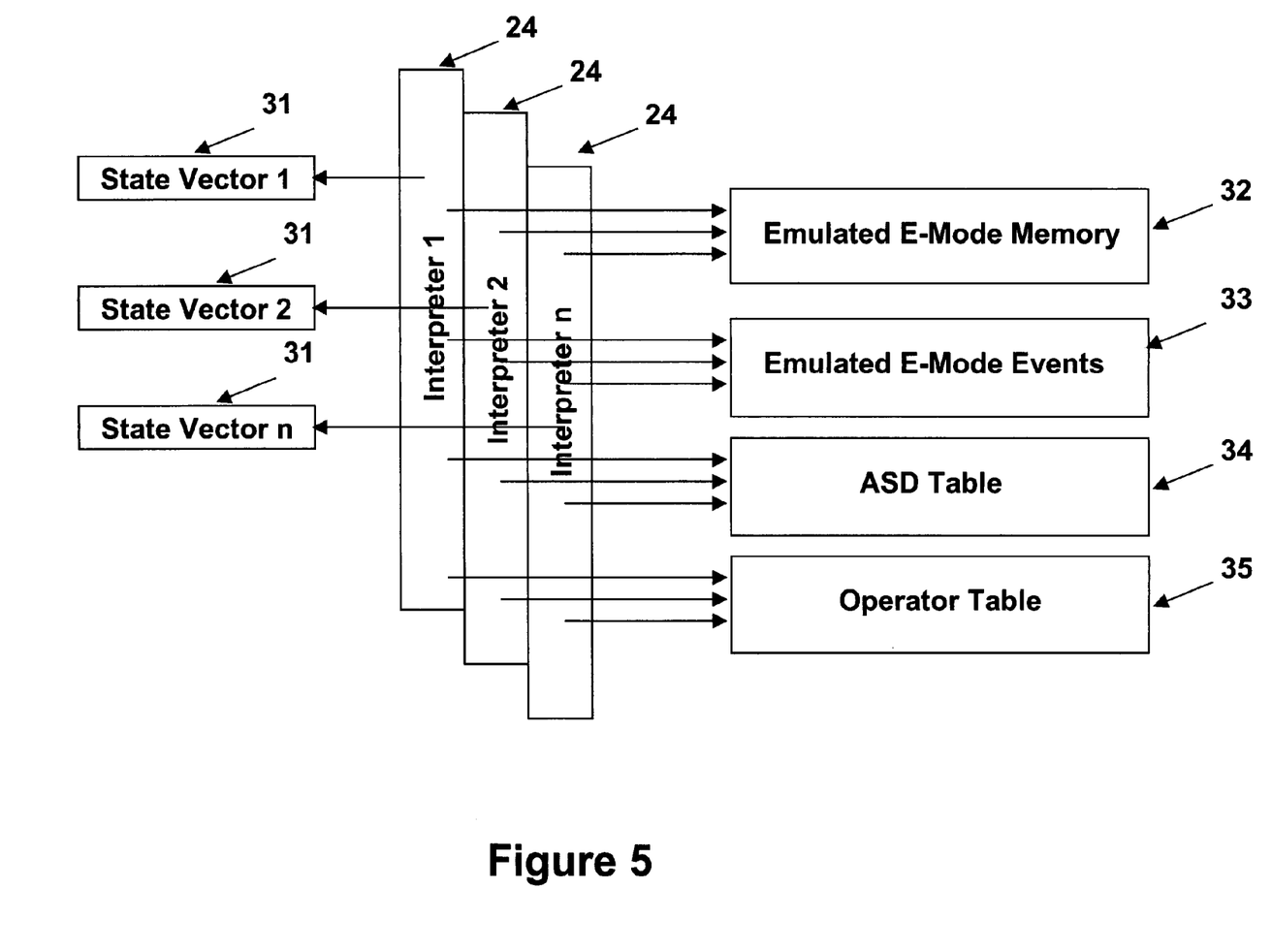
FIG. 5 is a block diagram providing further details of the emulation system of FIG. 2.

With reference to FIG. 5, each emulated application is represented by a unique instantiation of the interpreter 24. All instantiations of the interpreter 24 share the following structures that are allocated by the emulation process 20 at load time:

1. A common area of memory to be used as the main memory 32 of the emulated system.
2. A common area of memory used to contain the emulated events and locks 33 of the emulated system.
3. A common ASD table 34 which is used for address generation within the common main memory 32.
4. An operator table 35 which contains the entry points to the operator routines.

In addition, each instantiation of the interpreter 24 maintains a private state vector 31 which contains the execution state of the application process that it is emulating. This includes pointers to the stack, the last stack item written (S register), base of current or next activation record (F register), lexical display registers, and the current code pointer.

Figure 6:
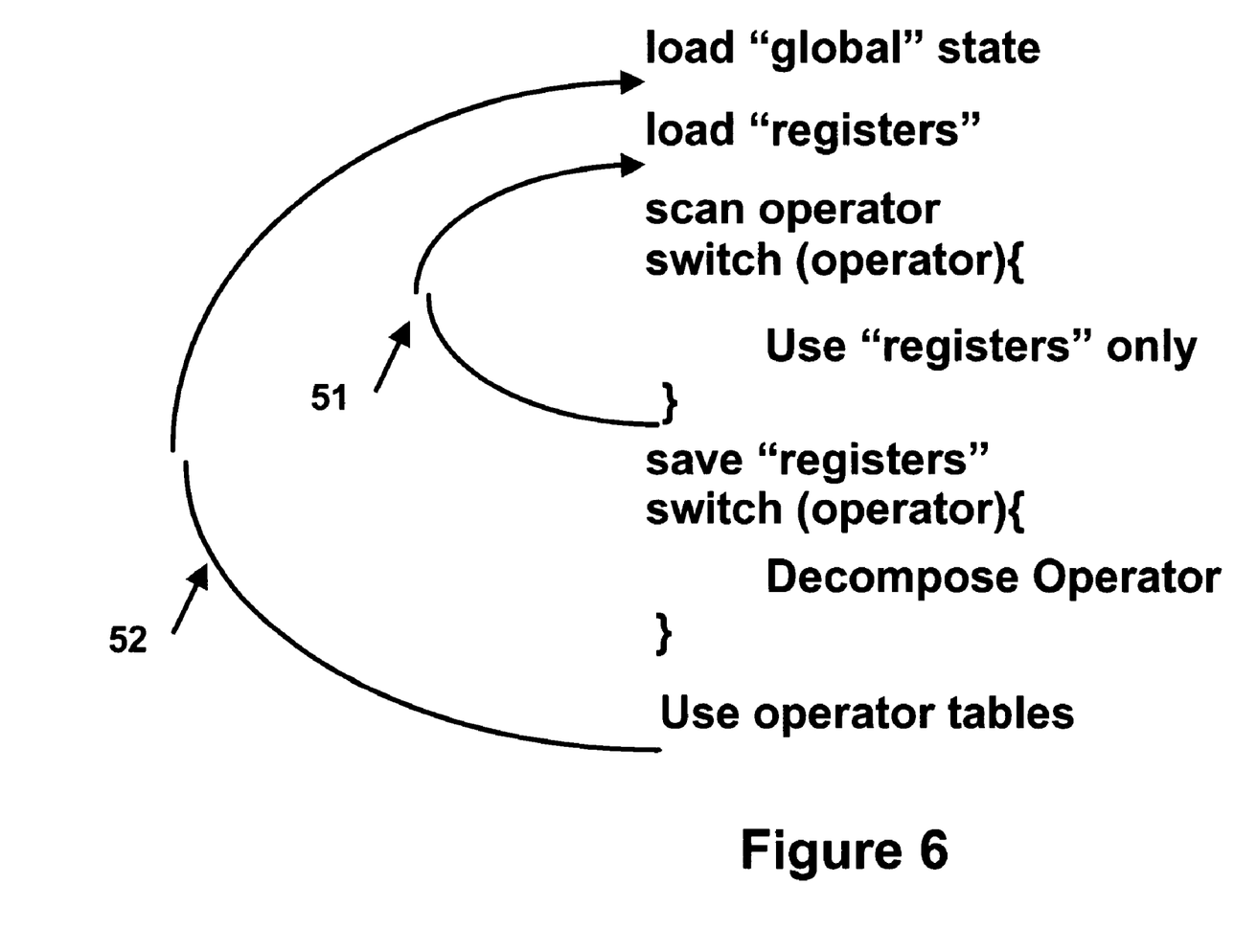
FIG. 6 illustrates the main execution loop of the interpreter of the emulation system of FIG. 2, in accordance with a preferred embodiment thereof.

FIG. 6 illustrates the main interpreter execution loop. The interpreter 24 makes up to two attempts to execute any given operator. The first pass 51 is constructed such that all the interpreter state, and the intermediate state required to implement the algorithms, is contained entirely within the general register set of the underlying microprocessor without requiring any access to the C stack. On entering this mode of operation, a very limited subset of the global interpreter state is copied into temporary variables that are never referenced external to this loop. The interpreter remains in this mode of operation until it detects an operator that cannot be interpreted in this manner, at which point it reinstates the global state from its temporary variables. This initial attempt to execute the operator handles all arithmetic operations on single precision positive integers (with the exception of division), all branching operations, nearly all loads and stores, and most descriptor indexing and evaluation operations. It also handles most procedure enter and exit operators. During dynamic execution, over ninety-five percent (95%) of all operators are interpreted during this pass.

The second pass 52 decomposes the operator into its original constituent elements and then uses an operator table to select the routine that implements the original E-Mode operator. As mentioned above, the interpreter 24 maintains a shadow version 34 of the ASD table to assist in the de-referencing of data descriptors and other reference words of the intermediate instruction set. Each entry contains a pointer to the first word and last word of the actual segment it describes. These pointers are NULL for non-present segments.

As the foregoing illustrates, the present invention is directed to a method and system for emulating the execution of a target program, comprising instructions of an instruction set of a target computer, on a host computer having a different instruction set. It is understood that changes may be made to the embodiments described above without departing from the broad inventive concepts thereof. Accordingly, the present invention is not limited to the particular embodiments disclosed, but is intended to cover all modifications that are within the spirit and scope of the invention as defined by the appended claims.

What is claimed is:

1. A method for emulating the execution of a target program comprising object code instructions of a native machine instruction set of a target computer on a host computer having a different native machine instruction set, said method comprising:

performing a static translation of the object code instructions of the target program into a series of instructions of an intermediate instruction set that is not the native machine instruction set of the host computer, the intermediate instruction set being optimized for interpretation on the host computer; and thereafter, executing the series of instructions of the intermediate instruction set by interpretation on the host computer using an interpreter.

2. The method recited in claim 1, wherein the intermediate instruction set comprises a plurality of control words that are derived, at least in part, by mapping control words of the instruction set of the target machine into the fundamental word size of the host machine.

3. The method recited in claim 1, wherein the intermediate instruction set comprises a plurality of control words that are derived by redefining control words of the target computer to minimize the number of masking and shifting operations needed to decode the plurality of control words of the intermediate instruction set.

4. The method recited in claim 1, wherein the intermediate instruction set comprises a plurality of different types of control words having formats defined to minimize the time needed to determine the type of a control word.

5. The method recited in claim 1, wherein the intermediate instruction set comprises a plurality of controls words derived from control words of the instruction set of the target machine in a manner that reduces the number of different forms of control words in the intermediate instruction set.

6. The method recited in claim 1, wherein a code structure of the intermediate instruction set comprises code words have a fixed length that matches the fundamental word size of the host machine.

7. The method recited in claim 1, wherein the instructions of the intermediate instruction set have a fixed length and do not cross code word boundaries.

8. The method recited in claim 1, wherein zero-address instructions of the instruction set of the target machine for pushing data onto a stack for use in a subsequent zero-address instruction operation are incorporated as explicit addresses into a new instruction in the intermediate instruction set for performing that operation, thereby reducing the number of different instructions in the intermediate instruction set.

9. An emulation system for emulating the execution of a target program comprising object code instructions of a native machine instruction set of a target computer on a host computer having a different native machine instruction set, said emulator comprising;
 a code translator that performs a static translation of the object code instructions of the target program into a series of instructions of an intermediate instruction set that is not the native machine instruction set of the host computer, the intermediate instruction set being optimized for interpretation on the host computer; and
 an interpreter that thereafter executes the series of instructions of the intermediate instruction set by interpretation directly on the host computer.

10. The emulation system recited in claim 9, wherein the intermediate instruction set comprises a plurality of control words that are derived, at least in part, by mapping control words of the instruction set of the target machine into the fundamental word size of the host machine.

11. The emulation system recited in claim 9, wherein the intermediate instruction set comprises a plurality of control words that are derived by redefining control words of the target computer to minimize the number of masking and shifting operations needed to decode the plurality of code words of the intermediate instruction set.

12. The emulation system recited in claim 9, wherein the intermediate instruction set comprises a plurality of different types of control words having formats defined to minimize the time needed to determine the type of a control word.

13. The emulation system recited in claim 9, wherein the intermediate instruction set comprises a plurality of control words derived from control words of the instruction set of the target machine in a manner that reduces the number of different forms of control words in the intermediate instruction set.

14. The emulation system recited in claim 9, wherein a code structure of the intermediate instruction set comprises code words having a fixed length that matches the fundamental word size of the host machine.

15. The emulation system recited in claim 9, wherein the instructions of the intermediate instruction set have a fixed length and do not cross code word boundaries.

16. The emulation system recited in claim 9, wherein the code translator runs as a user mode process under control of a host operating system on the host computer, and wherein the interpreter runs as a kernel mode driver thread under the host operating system.

17. The emulation system recited in claim 9, wherein the emulation system may comprise multiple instances of the interpreter each running as a different thread in the kernel space of the host operating system.

18. The emulation system recited in claim 9, wherein zero-address instructions of the instruction set of the target machine for pushing data onto a stack for use in a subsequent zero-address instruction operation are incorporated as explicit addresses into a new instruction in the intermediate instruction set for performing that operation, thereby reducing the number of different instructions in the intermediate instruction set.

19. A computer-readable medium having stored thereon program code that when executed by a host computer enables the host computer to emulate the execution of a target program comprising object code instructions of a native machine instruction set of a target computer on the host computer, wherein the host computer has a different native machine instruction set, by:
 performing a static translation of the object code instructions of the target program into a series of instructions of an intermediate instruction set that is not the native machine instruction set of the host computer, the intermediate instruction set being optimized for interpretation on the host computer; and thereafter,
 executing the series of instructions of the intermediate instruction set directly by interpretation on the host computer using an interpreter.

20. The computer-readable medium recited in claim 19, wherein the intermediate instruction set comprises a plurality of control words that are derived, at least in part, by mapping control words of the instruction set of the target machine into the fundamental word size of the host machine.

21. The computer-readable medium recited in claim 19, wherein the intermediate instruction set comprises a plurality of control words that are derived by redefining control words of the target computer to minimize the number of masking and shifting operations needed to decode the plurality of control words of the intermediate instruction set.

22. The computer-readable medium recited in claim 19, wherein the intermediate instruction set comprises a plurality of different types of control words having formats defined to minimize the time needed to determine the type of a control word.

23. The computer-readable medium recited in claim 19, wherein the intermediate instruction set comprises a plurality of controls words derived from control words of the instruction set of the target machine in a manner that reduces the number of different forms of control words in the intermediate instruction set.

24. The computer-readable medium recited in claim 19, wherein a code structure of the intermediate instruction set comprises code words have a fixed length that matches the fundamental word size of the host machine.

25. The computer-readable medium recited in claim 19, wherein the instructions of the intermediate instruction set have a fixed length and do not cross code word boundaries.

26. The computer-readable medium recited in claim 19, wherein zero-address instructions of the instruction set of the target machine for pushing data onto a stack for use in a subsequent zero-address instruction operation are incorporated as explicit addresses into a new instruction in the intermediate instruction set for performing that operation, thereby reducing the number of different instructions in the intermediate instruction set.

27. A method for defining an intermediate instruction set based on the native machine instruction set of a target machine for use in an emulation system in which a target program, which comprises object code instructions of the target machine instruction set, is executed by emulation on a host computer having a different native machine instruction set by (i) performing a static translation of the object code instructions of the target program into series of instructions of the intermediate instruction set, and then (ii) executing the series of instructions of the intermediate instruction set directly by interpretation on the host computer using an interpreter, wherein the intermediate instruction set is optimized for interpretation on the host computer and is not the native machine instruction set of the host computer, said method comprising:

mapping control words of the native machine instruction set of the target machine into the fundamental word size of the host machine to derive a set of control words of the intermediate instruction set;

redefining control words of the native machine instruction set of the target machine to reduce the number of different forms of control words in the intermediate instruction set; and     defining a code structure of the intermediate instruction set in which code words of that structure have a fixed length that matches the fundamental word size of the native machine instruction set of the host computer.

28. The method recited in claim 27 wherein said step of mapping control words further comprises redefining control words of the instruction set of the target computer in the intermediate instruction set to minimize the number of masking and shifting operations needed to decode the control words of the intermediate instruction set.

29. The method recited in claim 27 wherein said step of mapping control words further comprises redefining control words of the instruction set of the target computer in the intermediate instruction set to minimize the time needed to determine the type of a control word of the intermediate instruction set.

30. The method recited in claim 27, further comprising defining a set of instructions of the intermediate instruction wherein the instructions have a same fixed length and do not cross code word boundaries.

31. The method recited in claim 27, further comprising incorporating zero-address instructions of the target machine instruction set for pushing data onto a stack for use in a subsequent zero-address instruction operation, as explicit addresses in a new instruction in the intermediate instruction set for performing that operation, thereby reducing the number of different instructions in the intermediate instruction set.

32. An emulation system for emulating the execution of a target program comprising instruction of an instruction set of a target computer on a host computer having a different instruction set, said emulation system comprising:

a code translator that performs a static translation of the instructions of the target program into a series of instructions of an intermediate instruction set, the intermediate instruction set being optimized for interpretation on the host computer; and     an interpreter that executes the series of instructions of the intermediate instruction set by interpretation on the host computer,     wherein the code translator runs as a user mode process under control of a host operating system on the host computer, and wherein the interpreter runs as a kernel mode driver thread under the host operating system.

33. An emulation system for emulating the execution of a target program comprising instruction of an instruction set of a target computer on a host computer having a different instruction set, said emulation system comprising:

a code translator that performs a static translation of the instructions of the target program into a series of instructions of an intermediate instruction set, the intermediate instruction set being optimized for interpretation on the host computer; and     an interpreter that executes the series of instructions of the intermediate instruction set by interpretation on the host computer,     wherein the emulation system may comprise multiple instances of the interpreter each running as a different thread in the kernel space of the host operating system.

\* \* \* \* \*